Figure 1:
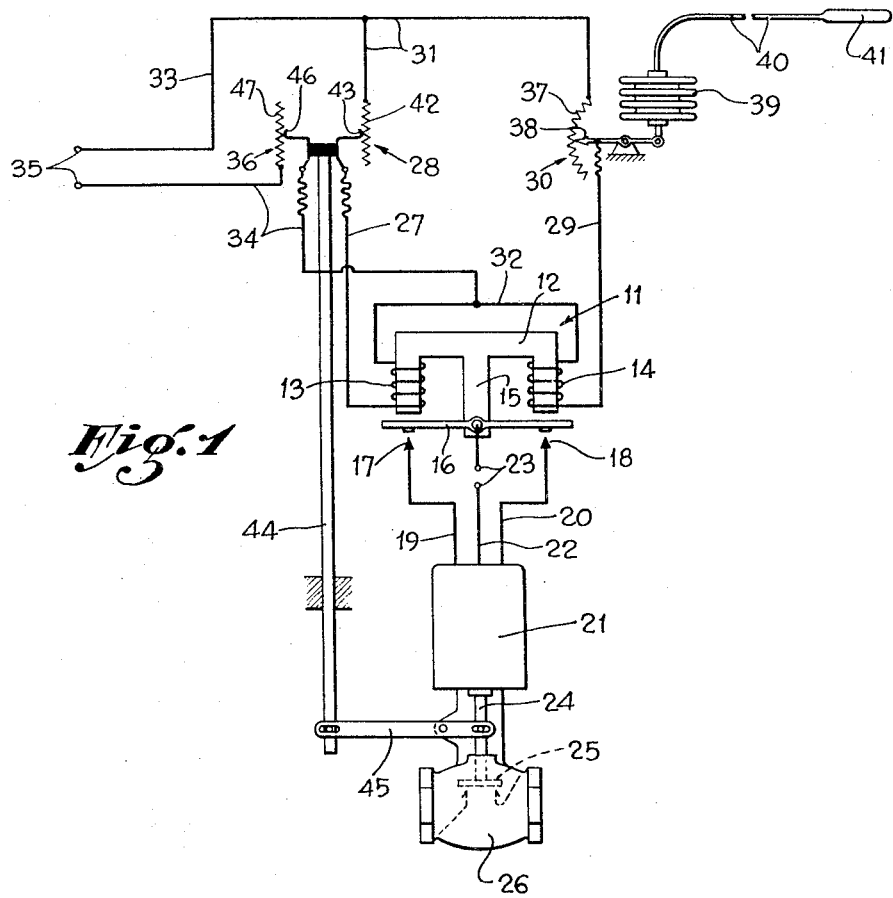

Nov. 22, 1949     W. A. RAY     2,488,780

MOTOR CONTROL FOLLOW-UP SYSTEM

Filed May 11, 1946

Inventor:
WILLIAM A. RAY,

By John H. Rouse,
Attorney.

Patented Nov. 22, 1949

2,488,780

UNITED STATES PATENT OFFICE 2,488,780

MOTOR CONTROL FOLLOW-UP SYSTEM

William A. Ray, North Hollywood, Calif., assignor to General Controls Co., Glendale, Calif., a corporation of California Application May 11, 1946, Serial No. 669,038

3 Claims. (Cl. 318—29)

My present invention relates to electrical control systems of the type wherein a reversible motor is employed to position a device, such as a valve closure, in accordance with the magnitude of a controlling condition, such as temperature or pressure; the motor being operated under the control of switching means selectively actuated by a relay, of the differential or balanced type, having a pair of coils the energization of which is controlled, respectively, by means responsive to the controlling condition and by follow-up means operated by the motor. In known systems of this type, the amount of current flowing through the relay coils (when the relay is balanced) varies considerably as the device is positioned at different points within its range, so that the sensitivity of control is altered at different values of the condition. It is therefore an object of this invention to overcome such deficiency by providing means whereby the amount of current through the coils, when the relay is balanced, is maintained constant regardless of the position of the device.

For full understanding of the invention, and further appreciation of its features and advantages, reference is to be had to the following detailed description and accompanying drawing, and to the appended claims.

Figure 2:
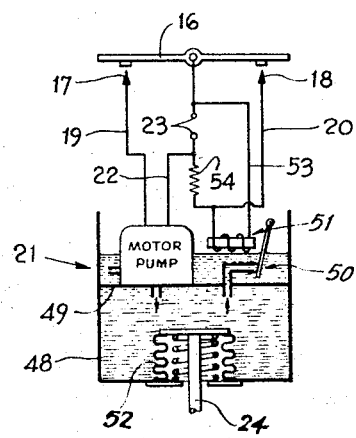

In the drawing:

Figure 1 is a diagrammatic view of a control system embodying the invention; and Figure 2 is a diagram showing a circuit whereby the operation of a particular type of reversible motor can be controlled by the balanced relay of the system of Fig. 1.

In the drawing, the numeral 11 generally indicates a relay, of the differential or balanced type, comprising an E-shaped core 12 around the outer side-arms of which are coils 13 and 14. Rockably mounted on the extremity of the middle arm 15 of the core is an armature 16 which serves as a switch blade cooperable separately with fixed contacts 17 and 18. These contacts are connected, by wires 19 and 20, to a reversible motor 21; another wire 22, having terminals 23 for a convenient source of electrical energy, connecting the armature 16 to the motor. It will be understood that when the armature is in engagement with one of the contacts 17—18 the stem 24 of the motor is actuated longitudinally in one direction, and in the opposite direction when the other contact is engaged; the motor being deenergized when the armature is in its neutral or balanced position, as shown, so that the motor stem is maintained in the position which it had reached when the armature was balanced. The motor stem 24 is shown, by way of example, attached to the closure 25 of a fluid control valve 26 for adjusting the flow therethrough. While the motor 21 can be of any suitable type such as one in which the operating stem is driven through a gear-train by a reversible rotary electric-motor, it is preferably of the type disclosed in Ray Patent No. 2,276,591 and illustrated schematically in Fig. 2. This motor comprises a liquid container 48 having a partition 49 which constitutes the portion of the container below it a pressure chamber. Mounted on this partition is a motor pump, indicated by the legend, and a relief valve 50 operated by an electromagnet 51. Upon engagement of armature 16 with contact 17 the pump forces liquid into the pressure chamber and thereby effects contraction of a spring-loaded bellows 52 and downward movement of stem 24; the relief valve being held closed since its electromagnet 51 is permanently connected across the source terminals 23 by a wire 53 and resistor 54. When the other contact 18 is engaged by the armature the electromagnet is shorted-out through these elements and wires 20 and 53 (resistor 54 limiting current-drain from the source) so that the relief valve opens to permit liquid to escape from the pressure chamber and the stem 24 to rise.

The relay coil 13 is in a local circuit which includes wire 27 and a rheostat 28, and the coil 14 is in a similar local circuit which includes wire 29 and a rheostat 30; these local circuits being connected together in parallel by wires 31 and 32. Energy is supplied to the parallel circuits through a main circuit comprising wires 33 and 34 which lead to terminals 35 for a suitable source of direct or alternating current; another rheostat 36 being connected in the wire 34. The rheostat 30 comprises a resistor element 37 and cooperating contact arm 38 and is arranged to be actuated by a conventional thermostatic device comprising an expansible-contractible bellows 39, connected to the arm 38, and associated capillary tube 40 and thermal bulb 41. The rheostat 28 similarly comprises a resistor element 42 and contact arm 43 and is arranged for actuation by follow-up means comprising a rod member 44, insulatingly carrying the contact arm 43, which is reciprocated in accordance with the movement of the motor stem 24 through the medium of a lever 45. Also insulatingly carried by the rod 44 is a contact arm 46 which, together with a resistor element 47, constitutes the rheostat 36.

In describing the operation of the system it will be assumed, by way of example, that the valve 26 is arranged to control supply of fuel gas to apparatus for heating a space wherein the thermal bulb 41 is located. With the parts in the positions shown in the drawing, the thermostatically controlled rheostat 30 is set, in accordance with the temperature of the thermal bulb, at the middle of its range. The follow-up rheostat 28 is also at the middle of its range, which point corresponds to the position of the motor stem 24 when the valve 26 is in half-open condition. The resistors 42 and 37 conveniently have the same resistance values, and the impedance values of the coils 13 and 14 also are equal, so that the same amount of current flows in each of the local parallel circuits constituted by the individual rheostats and coils. The armature 16 is therefore in its balanced condition since the tractive magnetic forces acting on both of its ends are the same and both of the contacts 17 and 18 are relatively widely separated from the armature.

If the temperature of the thermal bulb 41 now increases, the resultant expansion of the bellows effects upward movement of the contact arm 38 so that an increased amount of current flows through coil 14, due to the reduction of resistance of its local circuit, and the armature is rocked counterclockwise toward that end of the core so that the motor circuit is closed through contact 17 and the motor operates to move the valve closure 25 downwardly toward its seat to effect reduction of the fuel supply. In this downward movement of the motor stem 24 the follow-up rod 44 is raised so that the setting of rheostat 28 is altered, and when, as a result, the current flow through coil 13 becomes equal to that through coil 14 the relay is rebalanced and operation of the motor discontinued. Since the resistance values of the rheostats 28 and 30 are smaller at their altered settings, more current would normally flow through both of the coils; however, by the upward movement of the follow-up rod the setting of rheostat 36 was altered to increase the resistance of the main supply circuit so that a compensatingly smaller amount of current can flow to the local circuits.

It is believed to be apparent that when the temperature of the thermal bulb decreases sufficiently, the relay is so unbalanced due to the increase of resistance of rheostat 30 that the armature then rocks clockwise and, due to the resultant engagement of contact 18, the motor is operated to effect opening or upward movement of the valve closure; the relay again being balanced by the follow-up mechanism.

To effect full current compensation, so that exactly the same amount of current flows through the relay coils when the relay is balanced regardless of the settings of the rheostats, the value of resistor 47 should be equal to that of the resistors 42 and 37 in parallel when the latter have equal resistance values, as assumed. For example, if the resistance of each of resistors 42 and 37 is 20 ohms, the resistance of resistor 47 should be 10 ohms. When the three rheostats are set at their middle positions, as shown, the value of rheostat 36 is then 5 ohms and that of the rheostats 28 and 30, in parallel (10 ohms in parallel with 10 ohms), also 5 ohms so that the combined resistance is 10 ohms. When the contact arms of the rheostats are at their top positions, the value of rheostat 36 is 10 ohms and that of the other rheostats zero, so that the total resistance is still 10 ohms.

When the contact arms are at their bottom positions, the value of rheostat 36 is zero and that of rheostats 28 and 30, in parallel (the total resistance) is 10 ohms. Since it has been assumed that the coils 13 and 14 have equal impedance values, the current flowing through them is therefore the same at all like positions of the rheostats, so that the sensitivity of control of the relay is unaltered.

The embodiment of my invention herein shown and described is obviously susceptible of modification without departing from the spirit of the invention, and I intend therefore to be limited only by the scope of the appended claims.

I claim as my invention:

1. In a control system: a device to be positioned in accordance with the magnitude of a controlling condition; an electrically-controlled reversible motor for actuating said device; switching means for selectively controlling the operation of said motor in opposite directions, and having a neutral position; a balanced relay for actuating said switching means and comprising a pair of coils arranged in local circuits parallel to each other, said coils when equally energized being effective to maintain the switching means in said neutral position; a main circuit for supplying energy to both of said local circuits in common; a rheostat in each of said local circuits for varying the energization of the respective coils; means responsive to said condition for varying the setting of one of said rheostats in accordance with variation of the condition so that said relay is unbalanced; follow-up means, operated by the resultant operation of said motor and actuation of said device, for so varying the setting of the other of said rheostats that the relay is rebalanced when said device reaches its new position; and means, effective when the relay is balanced, for compensating for the variation of energization of said coils due to the variation of setting of the rheostats, comprising an additional rheostat in said main circuit and actuated by said follow-up means.

2. In a control system: a device to be positioned in accordance with the magnitude of a controlling condition; an electrically-controlled reversible motor for actuating said device; switching means for selectively controlling the operation of said motor in opposite directions, and having a neutral position; a balanced relay for actuating said switching means and comprising a pair of coils arranged in local circuits parallel to each other, said coils having the same resistance values so that when the same amount of current flows in both of said local circuits the relay is balanced and said switching means is in said neutral position; a main circuit for supplying current to both of said local circuits in common; a rheostat, comprising a resistor and a cooperating contact arm, in each of said local circuits for controlling current flow therethrough, the resistance range of both of the rheostats being the same; means responsive to said condition for varying the setting of one of said rheostats in accordance with variation of the condition so that said relay is unbalanced; follow-up means, operated by the resultant operation of said motor and actuation of said device, for so varying the setting of the other of said rheostats that the relay is rebalanced when said device reaches its new position; and an additional rheostat in said main circuit and so actuated by said follow-up means that, when the relay is balanced, the same amount of current flows in said local circuits regardless of the position of the device, the resistance range of said additional rheostat being equal to that of the first-mentioned rheostats in parallel.

3. In a control system: a device to be positioned in accordance with the magnitude of a controlling condition; an electrically-controlled reversible motor for actuating said device; switching means for selectively controlling the operation of said motor in opposite directions, and having a neutral position; a balanced relay for actuating said switching means and comprising a pair of coils arranged in local circuits parallel to each other, said coils having the same resistance values so that when the same amount of current flows in both of said local circuits the relay is balanced and said switching means is in said neutral position; a main circuit for supplying current to both of said local circuits in common; a rheostat, comprising a resistor and a cooperating contact arm, in each of said local circuits for controlling current flow therethrough, the resistance range of both of the rheostats being the same; means responsive to said condition for varying the setting of one of said rheostats in accordance with variation of the condition so that said relay is unbalanced; follow-up means, operated by the resultant operation of said motor and actuation of said device, and comprising a member for carrying the contact arm of the other of said rheostats, said follow-up means being effective to so vary the setting of the other of said rheostats that the relay is rebalanced when said device reaches its new position; an additional rheostat in said main circuit and so actuated by said follow-up means that, when the relay is balanced, the same amount of current flows in said local circuits regardless of the position of the device, the resistance range of said additional rheostat being equal to that of the first-mentioned rheostats in parallel; said follow-up member serving as a common support for the contact arm of said additional rheostat and the contact arm of said other of the first-mentioned rheostats.

WILLIAM A. RAY.

REFERENCES CITED

The following references are of record in the file of this patent:

UNITED STATES PATENTS

| Number | Name | Date |
|---|---|---|
| 1,689,516 | Bliss | Oct. 30, 1928 |
| 2,307,077 | Reagan | Jan. 5, 1943 |
| 2,340,004 | McGrath | Jan. 25, 1944 |